2,921,932

HIGH PRESSURE POLYMERIZATION OF STYRENE

Lowell E. Erbaugh, Vandalia, and John D. Calfee, Dayton, Ohio, assignors to Monsanto Chemical Company, St. Louis, Mo., a corporation of Delaware No Drawing. Application January 28, 1954
Serial No. 406,878

9 Claims. (Cl. 260—85.5)

This invention relates to the polymerization of styrene. In its more specific aspects the invention relates to controlled homopolymerization and copolymerization of styrene at high pressures to produce resinous styrene polymers having high heat distortion temperature.

Styrene is one of the most important monomers of commerce. Polystyrene resins find a great variety of uses, particularly for molded articles. Polymers made by the copolymerization of styrene with other monomers, e.g., $\alpha$-methylstyrene, acrylonitrile, butadiene, have properties making them particularly valuable for specific uses. The present commercial methods for making styrene polymers involve polymerization of monomeric styrene in the presence of peroxide catalysts, either by mass, bulk polymerization or by suspension or emulsion polymerization. One of the problems is to obtain a very high conversion of the monomer to high molecular weight polymer. Ordinarily, the polymerization is carried out over a period of a number of hours at comparatively low temperatures, say in the neighborhood of 100° C., whereby a high proportion of the monomer is converted to high molecular weight polymer; this is followed by a so-called "finishing" step effected at a higher temperature and intended to obtain as complete polymerization as possible of the residual monomer in the reaction mass. Such finishing operations cannot be considered to be completely successful in their present state of development, however, for several reasons. As is well known, increase in polymerization temperature tends to give a decrease in molecular weight of the resulting polymer. Thus the polymer made from the residual monomer is lower in molecular weight than the bulk of the polymer. Further, subjecting the polymer mass to high temperatures tends to cause some "cracking" or decomposition of polymer already formed. Further, usually the amount of catalyst present in the reaction mass at the time it is subjected to the high temperature finishing operation is not optimum. The presence of unreacted monomer, and of low molecular weight polymeric material formed by high temperature polymerization of monomer remaining after the principal polymerization reaction and by decomposition of polymer already formed, results in a final product that undergoes distortion (when subjected to a load) at a lower temperature than is desirable. It is important for a styrene polymer product to have as high a heat distortion temperature as possible, in order that products made therefrom will have reasonable dimensional stability.

One or more of the foregoing disadvantages are overcome by the practice of various embodiments of the present invention, wherein a monomeric material comprising a major proportion of styrene is subjected to polymerization at a pressure of at least 10,000 pounds per square inch, first at a temperature within the range of 90–160° C. until at least 90 weight percent of said monomeric material has become polymerized and then at a temperature above 170° C. until the unreacted monomer content of the resulting reaction product is less than 1.5 weight percent, resulting in the production of high molecular weight resinous polymer having high "heat distortion temperature." While styrene has heretofore been polymerized under very high pressures, the polymerization was either carried only to a low conversion, or was uncontrolled in that it was of the "explosive" type wherein the bulk of the polymerization occurred during a very short period of time and with a very sharp temperature rise. Such prior work with styrene at high pressures was at most of theoretical interest and did not make possible the practical production of a commercially usable product.

The practice of our invention results in a number of advantages, although we do not desire to be limited by any particular theory of reaction mechanism that may be advanced. An important feature of the invention is the fact that the high pressure polymerization of styrene is controlled to give useful products. The initial polymerization step is effected at temperatures within the range of 90–160° C. chosen to give comparatively rapid polymerization of the bulk of the monomeric material without loss of control of the polymerization rate which would result in uncontrolled temperature rise. The particular temperature within this range that is chosen for a given polymerization will be dependent to some extent on whether a catalyst has been added and on whether comonomers are present. The use of high pressures during the initial polymerization permits comparatively high polymerization temperatures without undue sacrifice in molecular weight. Thus the time required for the polymerization is very greatly reduced over that conventionally necessary. The higher polymerization temperature, made possible through the use of pressure, in itself gives a faster polymerization rate. Further, the effect of pressure per se is to give a faster polymerization rate than is obtained at otherwise identical conditions but ordinary atmospheric or autogenous pressure.

When at least 90 percent of the monomeric material has been polymerized at the chosen conditions, the temperature is increased to a value above 170° C. but ordinarily not above 225° C., while maintaining the high pressure on the reaction mass, whereby the remaining monomeric material undergoes polymerization. The second step in the process is continued until the reaction product contains less than 1.5 weight percent of unreacted monomer, which usually, but not always, corresponds to less than 2.0 weight percent material soluble in methanol (hereinafter termed "alcohol solubles"). This polymerization of the monomer remaining after the polymerization is from 90–95% complete, being conducted under high pressure, results in the formation of adequately high molecular weight product from the polymerizing residual monomer. Further, decomposition of already-formed polymer and of polymer formed during this step is avoided by the high pressure. The resulting final product, accordingly, being comparatively free of low molecular weight material, has a high heat distortion temperature.

An important feature of the invention is that addition of catalysts is unnecessary, or if catalysts are desired for some reason, the amount required is quite low and much less than that required when operating at conventional polymerization conditions. As a result, the final step of polymerization wherein residual monomer is converted to polymer is not dependent upon the presence of catalysts of the right type and right amount, but rather takes place readily in the absence of catalyst so that the results of such step are not influenced, as would be the case in conventional polymerization, by the success or failure of initial added catalysts to survive until the final step.

When comonomers are present along with the styrene the resulting copolymers, when prepared in accordance with the present invention, are more self compatible, i.e., more homogeneous, than comonomers made from the same monomeric mixture at conventional polymerization conditions. This is a very great advantage where one or more comonomers are used together with styrene to impart desired characteristics to the final product, in that the greater self-compatibility results in more homogeneous and transparent moldings.

The invention is applicable to the homopolymerization of styrene, i.e., the polymerization of a monomeric material consisting of styrene, and to the interpolymerization of styrene in a monomeric mixture comprising styrene and one or more ethylenically unsaturated monomers copolymerizable therewith. By way of example, but not limitation, of suitable comonomers, there can be mentioned: α-methylstyrene; mono- and dialkyl styrenes wherein the alkyl group or groups are substituted on the nucleus, e.g., vinyltoluene, vinylxylene, and the like; acrylonitrile; butadiene; ethyl acrylate; ethylene. In any event, the monomeric mixture should comprise a major proportion of styrene, i.e., greater than 50 weight percent of the polymerizable material should be styrene. Thus, the comonomer or comonomers can make up from say 1 to 49 weight percent of the monomeric material, usually from 5 to 25 percent being sufficient to give the desired properties. As mentioned hereinbefore, the particular comonomer, and the proportion thereof employed, will affect the choice of reaction conditions to some extent. Thus, for example, a monomeric mixture having a given percentage of acrylonitrile is polymerized at a lower temperature than a monomeric mixture having the same percentage of α-methylstyrene. Those skilled in the art, having had the benefit of the present disclosure, will readily determine suitable combinations of reaction conditions to be employed in polymerizing any particular monomeric material.

An essential feature of the present invention is the use of very high pressures, i.e., pressures of at least 10,000 pounds per square inch. Better results are obtained by employing pressures in excess of 20,000 pounds per square inch, and preferably in excess of 30,000 p.s.i. Much higher pressures, on up to say 100,000 to 200,000 pounds per square inch and higher, can be employed in suitable apparatus. It will be obvious that suitable safety precautions should be taken in practicing the present invention, but such are now well known in the art. In general, all other conditions being equal, the higher the pressure employed the higher the temperature that can be used within the stated temperature ranges, with resulting faster reaction rate. The initial and principal portion of the polymerization, resulting in the polymerization of at least 90 weight percent of the monomeric material to high molecular weight resinous styrene polymer, is carried out at one or more temperatures within the range of 90 to 160° C. It is usually sufficient to choose a single temperature within this range and maintain the reaction mixture at that temperature under the chosen high pressure until at least 90 weight percent, and preferably not over 95 weight percent, of the monomeric material has polymerized. However, it is entirely permissible to employ two or more different temperatures within the stated range, usually starting with a comparatively low temperature and after a period of time during which the polymerization is partially, say 50 percent, completed, increasing the temperature somewhat to carry out the remainder of this first portion of the polymerization, but still not exceeding about 160° C. Of course, different pressures can also be employed during the initial and/or final stages of the polymerization, provided the pressure at all times is at least 10,000 pounds per square inch. The reaction time will be dependent to a considerable extent on the pressure, temperature, composition of monomeric material, and reaction system. However, the first portion of the polymerization, effecting at least 90 percent polymerization of the monomeric material, is usually accomplished in from one to 20 hours, and usually less than 10 hours is sufficient; often less than one hour is sufficient. The final step in the polymerization, instituted when the polymerization is at least 90% completed, is effected at temperatures in excess of 170° C. The upper temperature limit is dictated by the ability of the reaction mass to withstand increased temperatures for the period of time necessary, and 225° C. can be taken as an upper limit that would not ordinarily be exceeded. The time required for the final step is likewise dependent upon the various reaction conditions as indicated for the first step, and in any event is sufficiently prolonged to insure that the unreacted monomer content of the final product is less than 1.5 weight percent. An alternative measure of the final polymerization step is to carry it to the point where the alcohol solubles content does not exceed about two percent; determination of alcohols solubles content is a more convenient procedure than the determination of unreacted monomer. Usually a time of from 1 to 3 hours is sufficient for the final step. As in the initial step of the process, the pressure should be maintained at all times no lower than 10,000 pounds per square inch.

The various advantages of the invention are perhaps realized to the greatest extent in polymerizations effected in bulk or mass. The terms "bulk" and "mass" are used synonymously herein. In bulk or mass polymerizations, the monomeric material is subjected to polymerization in the absence of any added inert liquid reaction medium such as water or organic liquid. It is in mass systems that the final polymerization is especially difficult to achieve and therefore the advantages of the present invention are most readily realized. It is not outside the scope of the invention, however, to effect it in solvent, suspension or emulsion polymerization systems. In solvent systems, a liquid organic material which is a solvent at least for the monomer and which may be a solvent or non-solvent for the polymer, is employed. In suspension or emulsion polymerization, a non-solvent medium, usually water, is used, with the monomer being suspended therein in fine particles. In emulsion polymerization the particles are so fine that the final polymer is obtained in the form of a stable emulsion or latex. In suspension polymerization the particles are somewhat larger. In either suspension or emulsion polymerization, the conventional emulsifying and suspending agents which may be used are well understood by those skilled in the art. Use of solvents or non-solvent liquid reaction media is particularly useful when the invention is to be practiced in a continuous manner, with the reaction mass flowing through an elongated reaction zone and being subjected to the required conditions during such flow.

It is preferred to employ no added catalyst when carrying out the process of the present invention. However, it may be desirable in some instances to employ some catalyst, which will be of the free-radical promoting type, such as the well-known organic and inorganic per compounds, e.g., hydrogen peroxide, potassium persulfate, the organic peroxides and hydroperoxides, e.g., benzoyl peroxide, tert.-butyl hydroperoxide, cumene hydroperoxide; or the azo type, e.g., α,α'-azo bis-isobutyronitrile. The quantity of catalyst, as indicated above, is less than that used at conventional polymerization conditions, and would seldom exceed 0.1 weight percent of the monomeric material. It is preferred that the reaction be conducted in the absence of molecular oxygen.

The products of the present invention can be subjected to conventional molding and other forming operations, and can be admixed with other polymeric materials, plasticizers, dyes, fillers, pigments and the like as required for any particular application.

The following examples present information on some preferred embodiments of the present invention. It will be understood that variations can be made from the particular proportions, conditions and materials recited in these examples, without departing from the invention in its broadest scope.

EXAMPLE 1

The reactor consisted of an electrically heated, 250 cc. stainless steel bomb capable of withstanding a working pressure of 40,000 p.s.i. The bomb was fitted with a 1/8" inside diameter thermowell which passed through the center of the bottom closure and extended into the middle of the reaction space. A conventional shaker-heating jacket combination supported the reactor and provided temperature control. By means of a manifold, the bomb was connected to safety and pressure indicating devices and to a high pressure water system under automatic control.

To start a run, the bomb was charged with monomer at room temperature, sealed by tightening the head closure, cooled to −78° C., evacuated, and then placed in the rocker shaker and connected to the high pressure water system. As the heating jacket brought the bomb to reaction temperature, the monomer was pressured with water. The system was maintained at operating pressure ±1,500 p.s.i. by having the water pump under automatic control.

Polymerization was followed by the pressure drop shown on recording instruments. Inasmuch as full operating pressure was restored automatically when system pressure fell 1,500 p.s.i., cessation of intermittent pumping action indicated completion of polymerization. Polymerization reaction time was recorded on this basis, but not the finishing time at elevated temperature. In some runs, the system remained under indicated temperature and pressure conditions several times longer than required for polymerization to go to completion as shown by constant pressure readings.

Upon completion of reaction, the system was depressurized and the polymer removed while still hot.

In the data given in Tables I and II, some results are included on polymerizations effected outside the scope of the present invention, in order that comparisons can be made.

The following test methods were used in obtaining the data given in Examples 1 and 2.

Heat distortion, ° C.: A.S.T.M. D648–45T.

Alcohol solubles, percent: Modification of A.S.T.M. test D703–49T methods of testing (d) methanol solubility test.

Unreacted monomer, percent: One percent solution of polymer in chloroform—ultraviolet absorption against known.

Tensile strength, lbs./sq. in.: A.S.T.M. 638–52T except at 25° C. instead of 23° C.

Molecular weight: Molecular weight was based on viscosity of a 2% solution in dioxane.

Data on the homopolymerization of styrene are presented in Table I.

Table I
CONTROLLED HIGH PRESSURE HOMOPOLYMERIZATION OF STYRENE [1]

| Run | Polymerization Schedule | | | | Pressure, p.s.i. | Percent MeOH Soluble | Heat Distortion, ° C. | Tensile Strength, lbs./in.[2] | Molecular Weight | Unreacted Monomer, Percent |
|---|---|---|---|---|---|---|---|---|---|---|
| | Initial | | Finishing | | | | | | | |
| | Temp., ° C. | Hrs. | Temp., ° C. | Hrs. | | | | | | |
| A | 120 | 4 | | | 35,000 | 6.64 | 77 | 7,650 | 82,000 | 2.9 |
| B | 135 | 1.5 | | | 35,000 | 2.11 | 82 | 8,270 | 68,000 | 1.9 |
| C | 150 | 1 | | | 35,000 | 2.6 | 80 | 8,300 | 58,000 | 2.9 |
| D [2] | 130 | 4 | | | Atmospheric | 0.33 | 85 | | | |
| E | 120 | 1.5 | 220 | 3 | 35,000 | 1.7 | 92 | 9,030 | 70,000 | |
| F | 90 | 10 | 220 | 3 | 35,000 | 1.3 | 90 | 7,500 | 112,000 | |
| G | 90 | 22 | 200 | 6 | 20,000 | .94 | 95 | 6,690 | 145,000 | |
| H | 120 | 5 | 200 | 3 | 20,000 | 1.29 | 94 | 7,850 | 91,000 | |
| I [3] | 90–115 | 26 | 180 | 2 | Atmospheric | 2.6 | 89 | 8,550 | 53,000 | |

[1] "Thermal" polymerization only (no catalyst). Peroxide catalysts required and used in making both D and I products listed.
[2] 77% conversion. Vacuum stripped to remove unreacted monomer. Data from U.S. Patent 2,638,465.
[3] Commercial polystyrene prepared by mass polymerization.

The data of Table I reveal a number of interesting things. Thus, all the products made in accordance with the invention, i.e., products obtained from runs E, F, G, and H, had heat distortion points of from 90–95° C. This is to be compared with the heat distortion temperature of 89° C. for product I which is a very high grade commercial product, and of 85° C. for product D, in which special pains were taken to vacuum strip the product to remove unreacted monomer in order to obtain as high a heat distortion temperature as possible. It will also be noted that the products A, B, and C, although made at high pressure, had low heat distortion temperatures. Consideration of the reaction times is also of interest. Product D was made in 4 hours, but the conversion was only 77 percent. Commercial product I was made in about 30 hours. In contrast, products E, F, and H, all made in accordance with the present invention, required a total of 4½, 13, and 8 hours respectively. Product G, also made in accordance with the invention, was maintained at 90° C. for 22 hours, but this was much longer than necessary and was a matter of convenience. It will be noted that the alcohol solubles content of products A, B, and C are all above 2 percent, and their unreacted monomer contents are all above 1.9 percent. The alcohol solubles contents of products E, F, G, and H are all below 2 percent; their unreacted monomer contents were not determined, as it is obvious, from the relationship of alcohol solubles content to unreacted monomer content, that it was below 1.5 percent.

EXAMPLE 2

In the apparatus and by the procedures described in Example 1, styrene was copolymerized with α-methyl-styrene. The data are given in Table II.

Table II
CONTROLLED HIGH PRESSURE COPOLYMERIZATION OF STYRENE WITH α-METHYLSTYRENE [1]

| Run | Percent α-MS | Percent Styrene | Polymerization Schedule | | | | Pressure, p.s.i. | Percent MeOH Soluble | Heat Distortion, °C. | Tensile Strength, lbs./in.[2] | Molecular Weight |
|---|---|---|---|---|---|---|---|---|---|---|---|
| | | | Initial | | Finishing | | | | | | |
| | | | Temp., °C. | Time | Temp., °C. | Hrs. | | | | | |
| J | 15 | 85 | 135 | 3 hrs | 180 | 2 | 35,000 | 2.66 | 97 | 7,740 | 51,000 |
| K | 20 | 80 | 135 | 3 hrs | | | 35,000 | 5.38 | 87 | 7,330 | 46,000 |
| L | 40 | 60 | 135 | 5 hrs | 180 | 2 | 35,000 | 1.06 | 96 | 7,670 | 34,000 |
| M [2] | 15 | 85 | 102 | 20 days | | | Atmospheric | 0.98 | 89 | 9,660 | |
| N [2] | 15 | 85 | 130 | 3 days | | | do | 0.92 | 88 | 8,420 | |
| O [2] | 25 | 75 | 120 | 6 days | | | do | 0.82 | 93 | 8,190 | |

[1] "Thermal" polymerization only (no catalyst). Peroxide catalysts required and used in making products M, N, and O.
[2] Polymer heated to a temperature of 190° C. at an absolute pressure of from 1-2 millimeters of Hg over a period of two hours to remove volatile components. Data from U.S. Patent 2,638,465.

The products M, N, and O were especially made to have high heat distortion temperatures, by subjecting the copolymers to a very low pressure at high temperature in order to remove volatile components. It will also be noted that the time required for polymerization was great in each of these instances. Product K, made at high pressure, by heating for 3 hours at 135° C., despite its high alcohol solubles content had a heat distortion temperature only 10 C. below product N. However, products J and L, also made at high pressure but further including a second step of heating at 180° C. for 2 hours while under said high pressure, had very high heat distortion temperatures, both of which were above the heat distortion temperatures of products M, N, and O (which products M, N and O had been especially made by the process of U.S. Patent 2,638,465 intended to give high heat distortion temperature).

While the invention has been described with particular reference to various preferred embodiments thereof, and examples have been given of suitable proportions and conditions, it will be appreciated that variations from the details given herein can be effected without departing from the invention in its broadest aspects.

We claim:

1. A process which comprises subjecting a monomeric material comprising at least a major proportion of styrene and not more than a minor proportion of at least one ethylenically unsaturated monomer copolymerizable therewith to polymerization at a pressure of at least 10,000 pounds per square inch, first at a temperature within the range of 90 to 160° C. until at least 90% of said monomeric material has become polymerized and then at a temperature above 170° C. until the unreacted monomer content of the resulting reaction product is less than 1.5 weight percent, resulting in the production of high molecular weight resinous styrene polymer.

2. A process according to claim 1 wherein said monomeric material consists of styrene.

3. A process according to claim 1 wherein said monomeric material comprises styrene and at least one ethylenically unsaturated monomer copolymerizable therewith.

4. A process according to claim 3 wherein said ethylenically unsaturated monomer is alpha-methylstyrene.

5. A process according to claim 3 wherein said ethylenically unsaturated monomer is acrylonitrile.

6. A process for the controlled polymerization of styrene at high pressures to produce a high molecular weight polystyrene resin of high heat distortion temperature and low alcohol solubles content, which comprises maintaining at all times during the polymerization a pressure of at least 10,000 pounds per square inch and effecting polymerization of from 90 to 95 weight percent of said styrene within the temperature range of 90 to 160° C. followed by polymerization at a temperature above 170° C. until the unreacted monomer content of the polystyrene product is less than 1.5 weight percent.

7. A process according to claim 6 wherein no catalyst is present during said polymerization.

8. A process according to claim 6 wherein said pressure is maintained above 30,000 pounds per square inch.

9. A process according to claim 8 wherein said 90 to 95 percent polymerization is effected at about 135° C. and said following polymerization is effected at about 200° C.

References Cited in the file of this patent

UNITED STATES PATENTS 2,685,575     Heiligmann     Aug. 3, 1954

OTHER REFERENCES

Gillham: Trans. Faraday Soc., 46, 497–503 (June 1950). Copy in Library.

Samaras: J. Appl. Chem., 243–245 (June 1951). Copy in Library.

UNITED STATES PATENT OFFICE
CERTIFICATE OF CORRECTION

Patent No. 2,921,932            January 19, 1960

Lowell E. Erbaugh et al.

It is hereby certified that error appears in the above numbered patent requiring correction and that the said Letters Patent should read as corrected below.

Column 7, line 28, for "10 C." read -- $1°$ C. --.

Signed and sealed this 8th day of December 1964.

(SEAL)
Attest:

ERNEST W. SWIDER
Attesting Officer

EDWARD J. BRENNER
Commissioner of Patents